United States Patent
Jasinschi et al.

(10) Patent No.: US 7,177,470 B2
(45) Date of Patent: Feb. 13, 2007

(54) METHOD OF AND SYSTEM FOR DETECTING UNIFORM COLOR SEGMENTS

(75) Inventors: Radu Serban Jasinschi, Ossining, NY (US); Nevenka Dimitrova, Yorktown Heights, NY (US); Lalitha Agnihotri, Fishkill, NY (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 626 days.

(21) Appl. No.: 10/294,406

(22) Filed: Nov. 13, 2002

(65) Prior Publication Data

US 2004/0090453 A1    May 13, 2004

(51) Int. Cl.
*G06K 9/00* (2006.01)
(52) U.S. Cl. .................. 382/170; 382/225; 382/165
(58) Field of Classification Search .............. 382/236
See application file for complete search history.

(56) References Cited

U.S. PATENT DOCUMENTS

| | | | |
|---|---|---|---|
| 5,521,841 A | 5/1996 | Arman et al. | |
| 5,606,655 A | 2/1997 | Arman et al. | |
| 5,708,767 A | 1/1998 | Yeo et al. | |
| 5,767,893 A | 6/1998 | Chen et al. | |
| 5,995,095 A | 11/1999 | Ratakonda | |
| 6,055,025 A | 4/2000 | Shahraray | |
| 6,182,069 B1 | 1/2001 | Niblack et al. | |
| 6,226,388 B1* | 5/2001 | Qian et al. | 382/103 |
| 6,278,446 B1 | 8/2001 | Liou et al. | |
| 6,381,363 B1* | 4/2002 | Murching et al. | 382/164 |
| 6,473,095 B1* | 10/2002 | Martino et al. | 715/726 |
| 6,671,402 B1* | 12/2003 | Pass et al. | 382/170 |
| 6,690,725 B1* | 2/2004 | Abdeljaoud et al. | 375/240.08 |
| 6,917,692 B1* | 7/2005 | Murching et al. | 382/103 |
| 2003/0103647 A1* | 6/2003 | Rui et al. | 382/103 |

OTHER PUBLICATIONS

Hanjalic, A.; "Shot-Boundary Detection: Unraveled and Resolved?", Circuits and Systems for Video Technology, IEEE Transactions on; vol. 12, Issue 2, Feb. 2002; pp. 90-105.*
N.V. Patel, I.K. Sethi; "Compressed Video Processing for cut detection", IEE Proc.—Vis. Image Signal Porcess., vol. 143, No. 5, Oct. 1996; pp. 315-323.*

(Continued)

*Primary Examiner*—Joseph Mancuso
*Assistant Examiner*—Yuzhen Ge

(57) ABSTRACT

The present invention provides a method of detecting segment boundaries for a series of successive frames in a video sequence. The method includes the steps of acquiring color information from each frame, determining a color histogram for each frame, and applying a boundary detection technique utilizing the color histograms. Finally, the method includes segmenting the frames of the video sequence into uniform color segments. In addition, a system is provided for detecting segment boundaries for a series of successive frames in a video sequence. The system includes means for acquiring color information from each frame, means for determining a color histogram for each frame, and means for applying a boundary detection technique utilizing the color histograms. Finally, the system includes means for segmenting the frames of the video sequence into uniform color segments. The boundary detection techniques include a family color histogram method, a weighted average color histogram method, a successive color histogram method, a stochastic method, a shot-based color histogram method, a mosaic color histogram method, and a computable macro-segment boundary method.

18 Claims, 7 Drawing Sheets

OTHER PUBLICATIONS

"Video Clustering Using Superhistograms in Large Archives", L. Agnihotri et al., Lect Notes in Comp. Science, vol. 1929, Nov. 2, 2000, pp. 62-73, XP001161201.

Video Compression Demystified by Peter D. Symes, McGraw-Hill Professional Publishing; ISBN: 0071363246; 1st edition (Dec. 20, 2000).

L. Theodosio, W. Bender, Salient Video Stills: Content and Context Preserved, Proceedings of ACM Multimedia Conference, ACM Press (1993).

A New Approach to Linear Filtering and Prediction Problems, Author: R. E. Kalman, Publication: Transactions of the ASME—Journal of Basic Engineering, 82 (Series D): 35-45 (1960).

* cited by examiner

METHOD OF AND SYSTEM FOR DETECTING UNIFORM COLOR SEGMENTS

FIELD OF THE INVENTION

The invention relates to a method and system for the segmentation and indexing of video sequences based on color information. In particular, a color histogram is used to classify the segments of a program into a scene using color similarity.

BACKGROUND OF THE INVENTION

The explosive growth of the usage of digital images and video in computer systems and networks has dramatically increased the need for multimedia database systems that effectively index, store, and retrieve image and video data based on their contents. Different techniques have been developed to better support the increased needs. Techniques for content-based image retrieval have been developed to enable users to retrieve images based on their visual similarities, while techniques for video shot boundary detection have been developed that aim to segment a continuous video sequence into visually consistent units, so that the sequence can be efficiently indexed and retrieved.

Video programs are generally formed from a compilation of different video segments. These segments are typically classified as either shots or scenes. For example, a scene is a place or setting where action takes place. A scene can be made up of one shot or many shots that depict a continuous action or event. A shot is a view continuously filmed by one camera without interruption. Each shot is a take. When additional shots of the same action are filmed from the same setup, the resulting shots are "retakes". Therefore, each shot consists of a sequence of consecutive frames, i.e., images, generated during a continuous and uninterrupted operating interval from a single camera. For example, in motion pictures, a shot is a continuous series of frames recorded on film that is generated by a single camera from the time it begins recording until is stops. In live television broadcasts, a shot constitutes those images seen on the screen from the time a single camera is broadcast over the air until it is replaced by another camera. Shots can be joined together either in an abrupt mode (e.g., butt-edit or switch) in which the boundary between two consecutive shots (known as a "cut") is well-defined, or through one of many other editing modes, such as, fade or dissolve which result in a gradual transition from one shot to the next. The particular transition mode that is employed is generally chosen by the director to provide clues about changes in time and place which help the viewer follow the progress of events.

There are known automatic video indexing methods which detect abrupt transitions between different shots. For example, U.S. Pat. No. 6,055,025 describes such a method. A "scene", is commonly considered to be a sequence of frames with closely related contents conveying substantially similar information. There are cases were the camera is fixed, thereby producing "still shots". However, in general, video programs are composed not only of still shots, but also "moving shots" (i.e., shots in which the camera undergoes operations such as pan, tilt and zoom). Consequently, because of camera motion the contents of a series of frames over an individual shot may change considerably, resulting in the existence of more than one shot in a given scene. Therefore, while boundaries between different shots are scene boundaries, such boundaries may be a subset of all the scene boundaries that occur in a video program since camera motion may produce inter-shot scene changes. Therefore, scenes can be defined as collections of shots, where a shot is a continuous set of frames without editing effects. The prior art also defines a scene as having multiple shots with the same theme, such as, for example, a dialog scene showing interchangeably the two actors involved in the dialog. However, there are exceptions to this definition, as there are movies having an opening with one long shot containing several scenes. For the purposes of the present invention, a scene typically consists of shots.

While prior art discloses different methods for finding the shot boundaries in a video program, none of the methods are accurate enough for video indexing purposes. One reason for this is that shots are many times spurious, that is, they are generated by artifacts, such as, camera flashes, that do not indicate a real change in scene information. Segmenting video into scenes is closer to the real information that is captured by the video.

For the purposes of the present invention, the term "uniform video segments" describes a collection of successive video frames for which a given visual property is uniform or approximately constant over a period of time. In particular, the present invention deals with color-based uniformity.

Color information is a very useful visual cue for video indexing. Typically, video uniform color segments are collections of successive frames which also have a "constant" overall color distribution. For example, in outdoor sports, such as, soccer or golf, there is a preponderance of the "green" and "blue" colors due to the presence of grass and sky in the video. If a color histogram is computed for these outdoor scenes, the "green" and "blue" bins will be prominent, that is, they will have the highest number of votes per bin.

A color superhistogram is generated by sequentially updating color histograms. One way of generating them is as follows. In videos, such as, in MPEG-1/2/4 the successive frames are organized as I-/-P/-B frames; these frames come in groups, such as, IBBBPBBBPBBBPBBB which are repeated. Color histograms are generated either for all frames or for selected frames. From a processing speed point of view one can subsample the frames in temporal domain. Either I frames or B frames are taken at a sampling rate. The color superhistogram is generated by combining the information of successive color histograms. This makes color superhistograms an important tool and feature to detect uniform color segments because it is a robust and stable color representation of a video. Generally, color information is fundamental for video indexing into uniform color segments. Hence, superhistograms are typically used to characterize video. Superhistograms can be used to identify genre, find program boundaries and also to generate visual summaries. For example, using program boundary detection, one can identify an episode of Seinfeld as opposed to a News program. Uniform color segment boundary detection of the present invention, however, enables the segmentation of a news program into individual story segments.

Therefore there is a need for an efficient and accurate method and system for detecting uniform color segment boundaries in a video program.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and described, the invention includes a method of detecting segment boundaries for a series of successive frames in a video sequence. The method includes the steps of acquiring color information from each frame, determining a color histogram for each frame, and applying a boundary detection technique utilizing the color histograms. Finally, the method includes segmenting the frames of the video sequence into uniform color segments.

The invention also includes a system for detecting segment boundaries for a series of successive frames in a video sequence. The system includes means for acquiring color information from each frame, means for determining a color histogram for each frame, and means for applying a boundary detection technique utilizing the color histograms. Finally, the system includes means for segmenting the frames of the video sequence into uniform color segments. The boundary detection techniques include a family color histogram method, a weighted average color histogram method, a successive color histogram method, a stochastic method, a shot-based color histogram method, a mosaic color histogram method, and a computable macro-segment boundary method.

It is understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENTS

The following description is presented to enable any person of ordinary skill in the art to make and use the present invention. Various modifications to the preferred embodiment will be readily apparent to those of ordinary skill in the art, and the disclosure set forth herein may be applicable to other embodiments and applications without departing from the spirit and scope of the present invention and the claims hereto appended. Thus, the present invention is not intended to be limited to the embodiments described, but is to be accorded the broadest scope consistent with the disclosure set forth herein.

System

Figure 1:
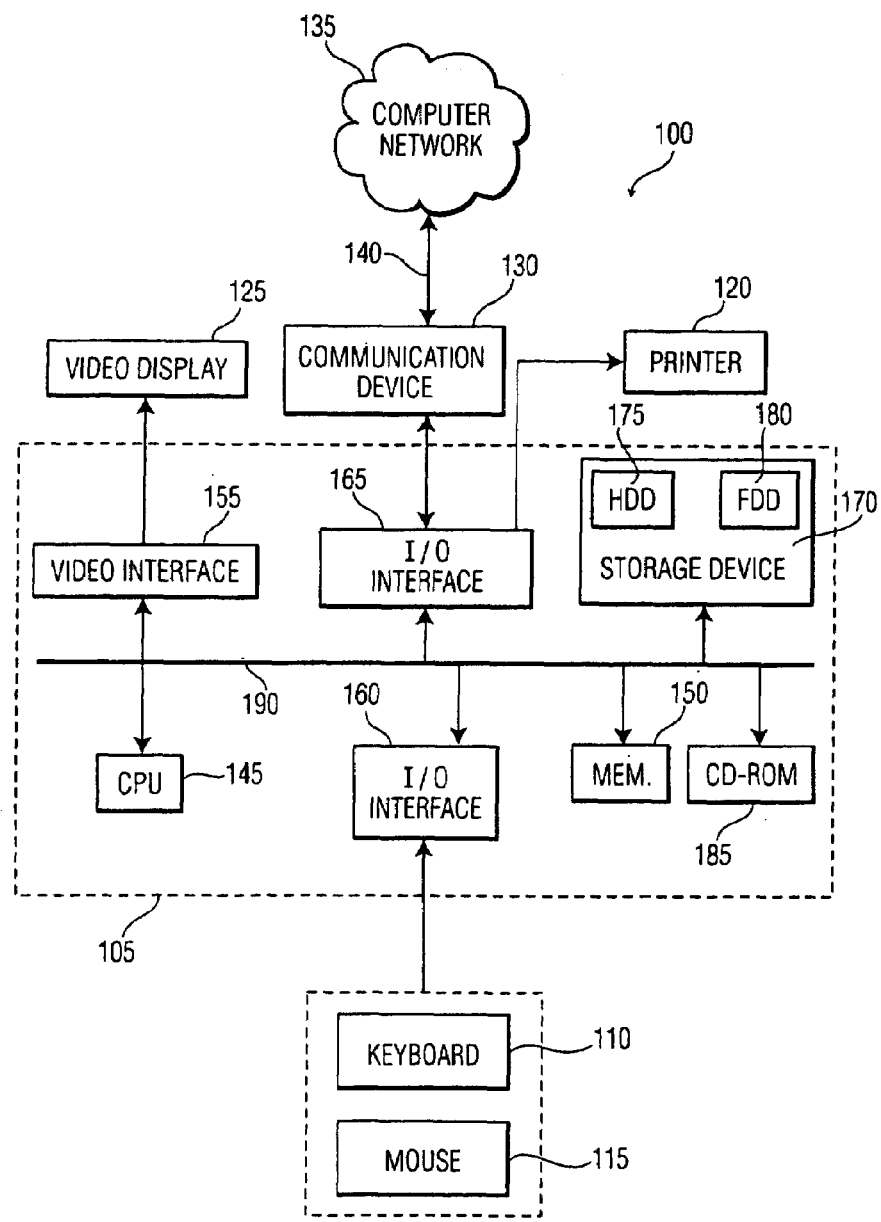
FIG. 1 is a is a schematic block diagram of a general-purpose computer with which the embodiments of the present invention can be practiced.
Figure 2:
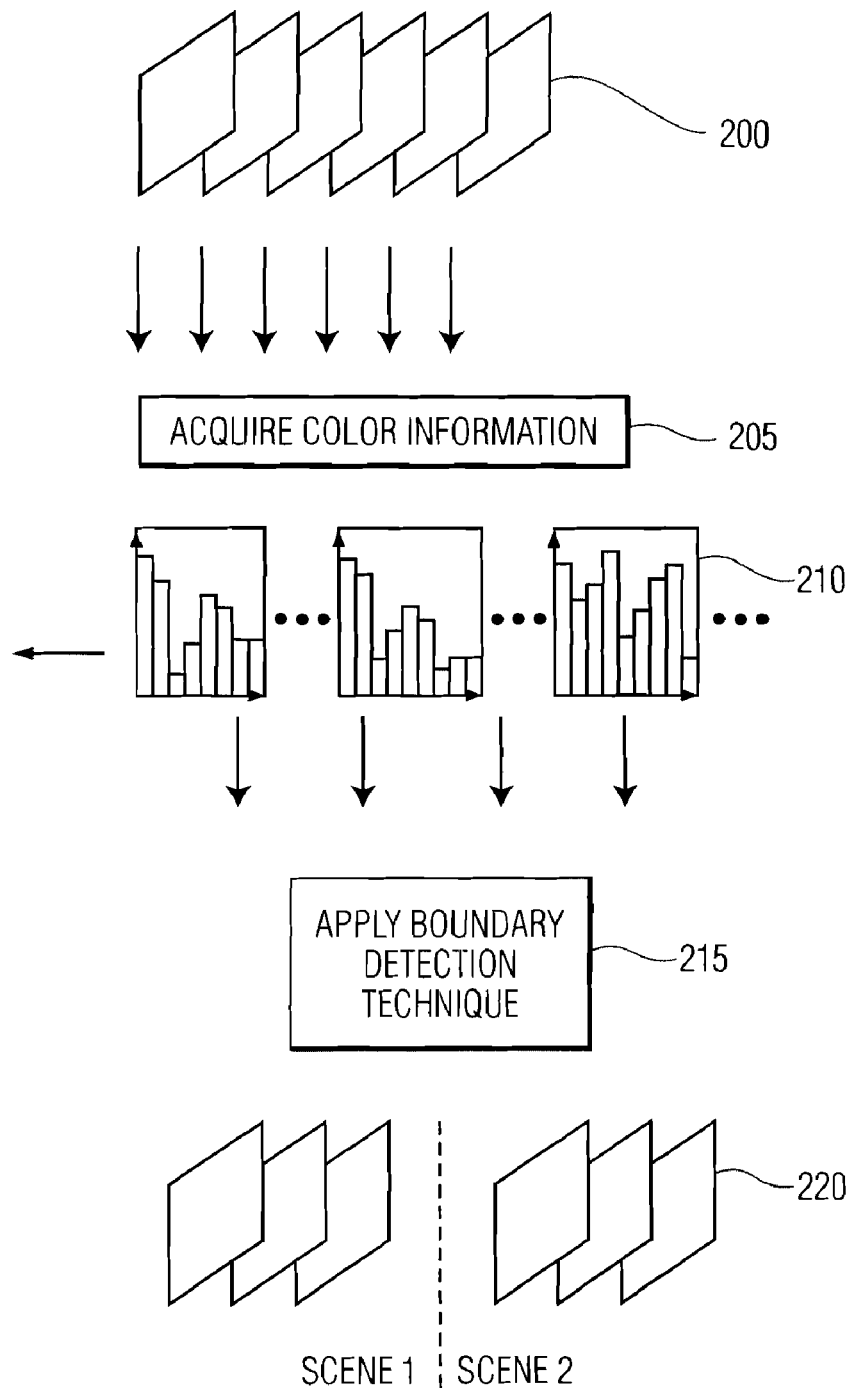
FIG. 2 is a flow diagram illustrating a general method in accordance with an embodiment of the present invention.

The method of detecting uniform color segment boundaries in a video sequence is preferably practiced using a conventional general-purpose computer system 100, such as that shown in FIG. 1 wherein the processes of FIG. 2 may be implemented as software, such as an application program executing within the computer system 100. In particular, the steps of method detecting uniform color segment boundaries are effected by instructions coded as software that are carried out by the computer. The software may be divided into two separate parts; one part for carrying out the video uniform color segment detection methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably constitutes an advantageous apparatus for detecting video uniform color segment boundaries in accordance with the embodiments of the present invention.

Computer system 100 comprises a computer module 105, input devices such as a keyboard 110 and mouse 115, output devices including a printer 120 and a display device 125. A communications device 130 in the form of a Modulator-Demodulator (Modem) transceiver can be used by the computer module 105 for communicating to and from a communications network 135, for example connectable via a telephone line 140 or other functional medium. The communications device 130 can be used to obtain access to the Internet, and other network systems, such as a Local Area Network (LAN) or a Wide Area Network (WAN).

The computer module 105 typically includes at least one processor unit 145 (CPU—Central Processing Unit), a memory unit 150, for example formed from semiconductor random access memory (RAM) and read only memory (ROM), input/output (I/O) interfaces including a video interface 155, and an I/O interface 160 for the keyboard 110 and mouse 115 and optionally a joystick (not illustrated), and an interface 165 for the communications device 130. A storage device 170 is provided and typically includes a hard disk drive 175 and a floppy disk drive 180. A magnetic tape drive (not illustrated) or a Smart Media type drive may also be used. A CD-ROM drive or DVD drive 185 is typically provided as a non-volatile source of data. The above components 145 to 160 mentioned above of the computer module 105, typically communicate via an interconnected bus 190 or other means suitable for data transfer, such as, for example, infra-red and bluetooth technologies, and in a manner, which results in a conventional mode of operation of the computer system 100 known to those in the relevant art. Examples of computers on which the embodiments can be practiced include IBM-PC's and compatibles, Sun Sparcstations, Apple Macintosh computers or alike computer systems evolved therefrom.

Typically, the application program of the preferred embodiment is resident on the hard disk drive 175 and read and controlled in its execution by the processor 145. Intermediate storage of the program and any data fetched from the network 135 may be accomplished using the semiconductor memory 150, possibly in combination with the hard disk drive 175. In some instances, the application program may be supplied to the user encoded on a CD-ROM or floppy disk and read via the corresponding drive 185 or 180 respectively, or alternatively may be read by the user from the network 135 via the modem communications device 130. Still further, the software can also be loaded into the computer system 100 from other computer readable medium including magnetic tape, ROM integrated circuit, a magneto-optical disk, a radio or infra-red transmission channel between the computer module 105 and another device, a computer readable card such as a PCMCIA card, and the Internet and Intranets including e-mail transmissions and information recorded on websites and the like. The foregoing is merely exemplary of relevant computer readable mediums. Other computer readable mediums may be used without departing from the scope and spirit of the invention.

The computer system 100 has the capability to store large amounts of video data, which serves as input to the uniform color segment boundary detection method. The video data may be input to the computer system 100 via a DVD-ROM drive 185 or directly via a camcorder (not shown) via input 165.

The method of detecting uniform color segment boundaries in a video sequence may alternatively be implemented in dedicated hardware such as one or more integrated circuits performing the functions or sub functions of FIG. 2. Such dedicated hardware may be incorporated in a camcorder or VCR or such like, and may include graphic processors, digital signal processors, or one or more microprocessors and associated memories.

General Method

Referring to FIG. 2, a method of detecting uniform color segment boundaries in a video sequence is illustrated. The method utilizes a set of boundary detection techniques for the segmentation and indexing of video sequences. According to a preferred embodiment of the present invention, each of the techniques is based on color information acquired from the video sequence. Color is a powerful visual attribute for general video segmentation and indexing. This includes the segmentation of video in terms of "uniform" color intervals.

Video uniform color segments are collections of successive frames which have a "constant" overall or dominant colors. To capture these dominant colors color histograms are used in the present invention. The color histogram is the count of the different colors in an image. Preferably, the color information is used to classify the segments of a program into a uniform color segment.

"Uniform color segment" can be defined as the one for which the color attribute is uniform, that is, constant or approximately constant based on color histogram information over a period of time.

Therefore, the method of detecting uniform color segment boundaries in a video sequence as illustrated in FIG. 2 includes a step of acquiring color information 205 for each frame in the video sequence 200. Based on the color information acquired, color histograms for each of the frames are determined in step 210. Deriving color histograms from video frames is well known in the art. Generally, every image is described by a number of colors, called a palette. The number of colors in the palette can be chosen in accordance with the application. The histogram counts the number of pixels in the image with a given range of colors. Each histogram is associated with a frame number. As mentioned above and as it is well known in the art, the color distribution of an image can be represented by a histogram, each bin of which corresponds to a range of values of each of the color components. For example, for an 8-bit image, the color components will range from 0 to 255 in value. Typically, there are two types of quantization methods: customized (or non-uniform) and uniform quantization. In the customized method it is preferred, for the purposes of the present invention, to choose a less than exhaustive palette. Colors such as black, white and skin tones, which are likely to appear in all frames, are preferably not chosen for the palette, or are given low weight. There can be a default bin for light gray, medium gray and dark gray to account for the shades of white and black. These could be given lower weight than other bins. Alternatively, other uniform quantization schemes can be used. Color quantization is typically the first step in computation of video histograms. There are various methods for color quantization and they are well known in the art. The factors involved are: which color space to use (e.g., HSV, YUV, RGB), how many colors to choose and how to subdivide the color space (e.g. 9, 30, 90, 900). For example, 128 bins can be used for Y (luminance) or 288 total bins with Y, $C_r$ (chrominance-red), $C_b$ (chrominance-blue) scaled down. There are many available possibilities. For purposes of example, and since MPEG operates in this space, Y, $C_r$, $C_b$ color space is used throughout. Alternatively, HSB (Hue, Saturation, Brightness) color space can be used to define the basic color bins.

After a histogram is defined for each frame at step 210 one of the boundary detection techniques, discussed in detail below, is applied at step 215. Following the application of a boundary detection technique the video stream is segmented into uniform color segments at step 220.

Application of Specific Boundary Detection Techniques

Temporarily, the video stream is made up of collections of successive frames or interlaced fields. The frames can be indexed according to I-frame positions in MPEG (1, 2, 4) video streams or according to video shots through extraction. MPEG is one of the video compression standards, which stands for Moving Picture Expert Group. The video shots could be extracted based on other methods, for example, DCT-based (Discrete Cosine Transform) methods that are well known in the art. For example, Video Compression Demystified by Peter D. Symes, McGraw-Hill Professional Publishing; ISBN: 0071363246; 1st edition (Dec. 20, 2000), which is incorporated herein by reference in its entirety, discloses such methods.

Figure 3:
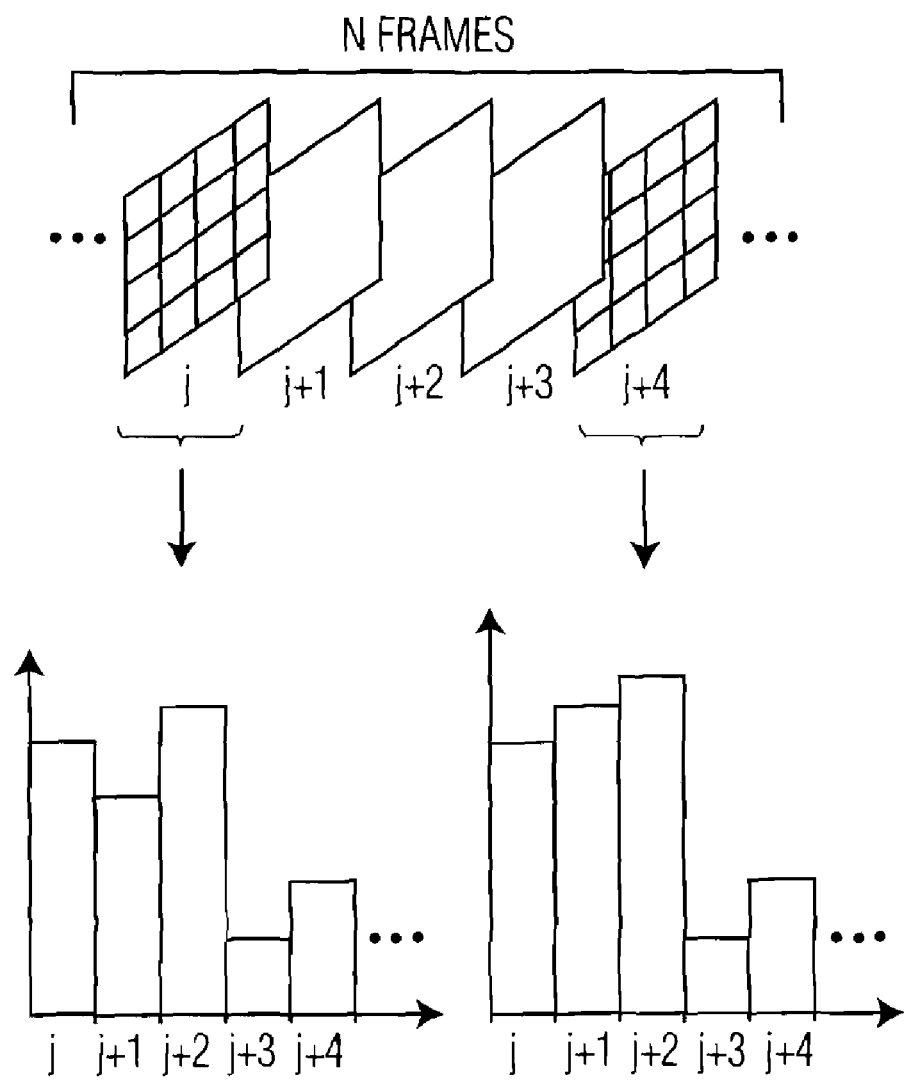
FIG. 3 is an illustration of one embodiment of the present invention.

Referring to FIG. 3, a typical collection of I-frames of a video sequence containing N frames is illustrated. For each I-frame there are 9-bin color histograms CH[i][j], where the index i denotes the bin position and the index j denotes the frame position in the video sequence. Different techniques for the detection of boundaries in a video sequence based on color "uniformity" are described below. The concept of "uniformity" is different for each method described. In addition, in the MPEG realm of video compression any type of frame can be used with all of techniques discussed below, e.g., I, P or B type frames. Preferably, I-frames are used due to a loss of resolution with P and B frames.

1. Family Color Histogram

Figure 4:
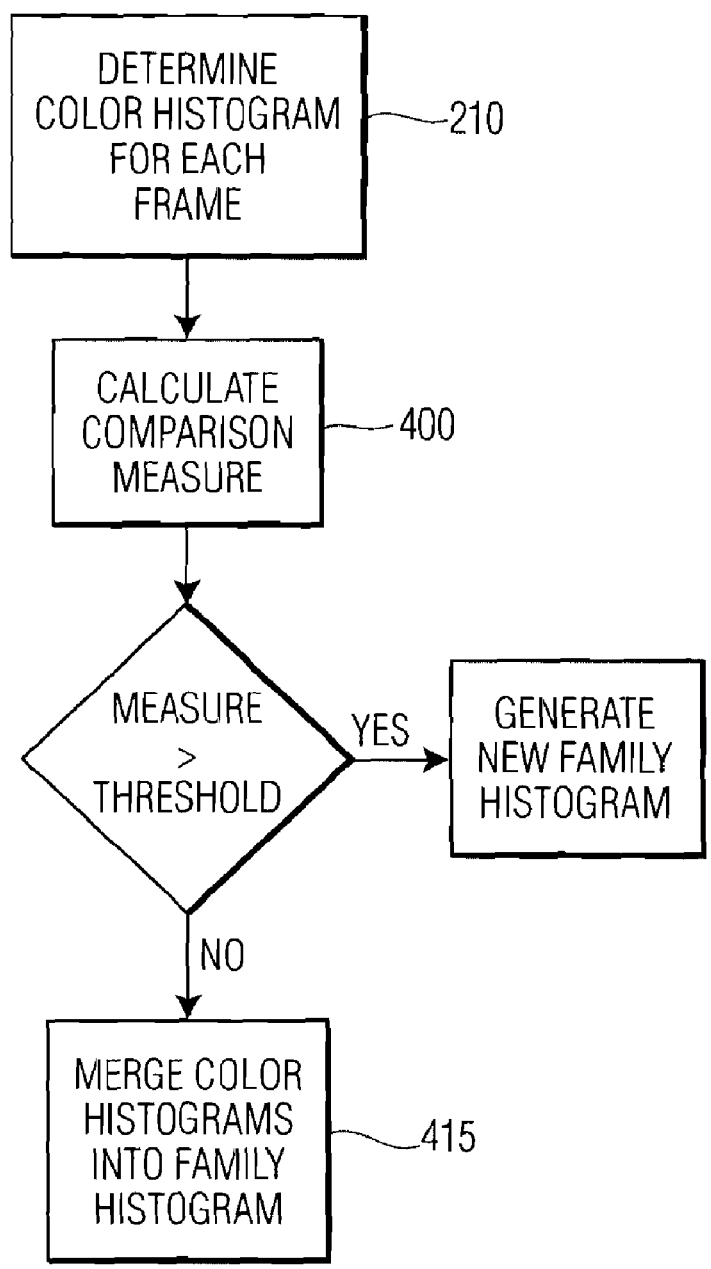
FIG. 4 is a flow diagram illustrating a family color histogram method in accordance with another embodiment of the present invention.

In this method a "family" color histogram $CH_F[i][j]$ is generated as follows: For $1 \leq j \leq N$ (wherein j is a frame index and i is a bin index): Referring to FIG. 4, the color histogram CH[i][j] for the jth frame is compared with that of the "family" color histogram $CH_F[i][j]$ by computing the following difference measure (step 400):

$$DCH_F[j] = \sum_{i=1}^{9} \|CH[i][j] - CH_F[i][j-1]\|, \quad \text{Equation (1)}$$

where the measure $\|.\|$ can be $L_1$, $L_2$, etc. as discussed below. For purposes of example only and not limitation, 9 bins are used. The "family" color histogram frame index in the expression of $DCH_F[j]$ is j−1.

(a) If $DCH_F[j]$ for the jth frame is smaller than a threshold $\tau_{DCH_F}$, then CH[i][j] is "merged" (step 415) with $CH_F[i][j-1]$, thus generating $CH_F[i][j]$. The "merging" can be performed by simple weighted averaging or by using Kalman filtering as described below.

(b) If $DCH_F[j]$ for the jth frame is larger than a threshold $\tau_{DCH_F}$, then CH[i][j] start a new "family" color histogram (step 410) and the jth frame is considered as the first frame of the next video "uniform color segment".

(c) The steps (a) and (b) are preferably repeated until j=N. At the end of this process, a collection of successive video "uniform color segments" that have a "uniform" color palette are determined. More than one bin in each "family" color histogram can be dominant.

As discussed above, the color histogram is computed for each frame and the previously computed family histograms are searched to find the closest family histogram match. The comparison between the current histogram, $CH_c$, (equivalent to CH[i][j]) and the previous family histograms, $CH_p$, (equivalent to $CH_F[i][j-1]$) can be computed using various histogram comparison methods. In accordance with another embodiment of the present invention, the following methods for calculating histogram difference D can be used:

(1) Histogram difference using $L_1$ distance measure can computed by using the following formula:

$$D = \sum_{i=1}^{N} |CH_c(i) - CH_p(i)|$$

Here, N is the total number of color bins used (for example, 9 bins can be used). The values obtained using this formula range between 0 and twice the maximum number of pixels in respective images. Since it is preferable to obtain percentage of similarity the value is normalized by dividing by the total number of pixels. The normalized values are between 0 and 1, where values close to 0 mean that the images are similar, and those close to 1 mean that the images are dissimilar.

(2) Alternatively, histogram difference using $L_2$ distance measure is computed by using the following formula:

$$D = \sqrt{\sum_{i=1}^{N} |CH_c(i) - CH_p(i))^2}$$

Similarly to case (1) the values of D are preferably normalized. $L_2$ norm is a squared value. However, in order to use it as a distance function the square root (e.g., Euclidean distance) is necessary.

(3) Histogram intersection can be computed using the following formula:

$$I = \frac{\sum_{i=1}^{N} \min(CH_c(i), CH_p(i))}{\sum_{i=1}^{N} CH_c(i)}$$

The values obtained using this formula range between 0 and 1. Values that are close to 0 indicate that the images are dissimilar and values that are close to 1 indicate that the images are similar. In order to compare histograms with the same interpretation of similarity, the formula D=1−I is used as a distance measure.

(4) The Chi-Square test for two image histograms is computed by using the following formula:

$$\chi^2 = \sum_{i=1}^{N} \frac{(CH_c(i) - CH_p(i))^2}{(CH_c(i) + CH_p(i))^2}$$

In this case, the values range between 0 and the number of color bins, N. The values are normalized using N, i.e., $D = \chi^2/N$.

(5) Bin-wise histogram intersection is computed using the following formula:

$$B = \sum_{i=1}^{N} \frac{\min(CH_c(i), CH_p(i))}{\max(CH_c(i), CH_p(i))}$$

Similarly to histogram intersection, lower values mean dissimilarity and higher values mean that images are similar. To be consistent with the previous measures, the distance is computed by using: D=1−B/N.

The above five methods allow different ways of measuring distance between histograms. A person skilled in the art will appreciate that any one of the above five distance measures can be used in a real application of the present invention. In addition, the prior art discloses other alternative distance measures that can be used (e.g., Mahalanobis distance).

2. Weighted Average Color Histogram

Alternatively, in accordance with another embodiment of the present invention, a different way of implementing the above method involves computing a weighted average color histogram height, a weighted average color histogram height variance, and a weighted average color histogram variance of the variance. These three averages are defined below.

(a) Weighted average color histogram height $<h>_{i,j}$ of the ith bin for the jth frame:

Equation (2)

$$\langle h \rangle_j = \sum_{i=1}^{\#bins} h_{i,j} \frac{e^{(h_{i,j} - \langle h \rangle_{j-1})^2 / 2 \cdot \sigma_h^2}}{\sigma_h \cdot \sqrt{2 \cdot \pi}},$$

where $$\frac{e^{(h_{i,j} - \langle h \rangle_{j-1})^2 / 2\sigma_h^2}}{\sigma_h \cdot \sqrt{2 \cdot \pi}}$$

represents a Gaussian weight function that depends on the average histogram height $\langle h \rangle_{j-1}$ defined at time instant j−1, and $\sigma_h$ is the height variance parameter.

(b) Weighted average color histogram height variance $\langle v \rangle_j$:

$$\langle v \rangle_j = \sum_{i=1}^{\#bins} v_{i,j} \frac{e^{(v_{i,j} - \langle v \rangle_{j-1})^2 / 2\sigma_v^2}}{\sigma_v \cdot \sqrt{2 \cdot \pi}} \quad \text{Equation (3)}$$

where $v_{i,j} \equiv h_{i,j} - \langle h \rangle_j$, and $$\frac{e^{(v_{i,j} - \langle v \rangle_{j-1})^2 / 2\sigma_v^2}}{\sigma_v \cdot \sqrt{2 \cdot \pi}}$$

is the Gaussian variance weight, and $\sigma_v$ is the variance parameter.

(c) Weighted average color histogram height variance of variance $\langle a \rangle_j$:

$$\langle a \rangle_j = \sum_{i=1}^{\#bins} a_{i,j} \frac{e^{(a_{i,j} - \langle a \rangle_{j-1})^2 / 2\sigma_a^2}}{\sigma_a \cdot \sqrt{2 \cdot \pi}}, \quad \text{Equation (4)}$$

where $a_{i,j} \equiv v_{i,j} - \langle v \rangle_j$, and $$\frac{e^{(a_{i,j} - \langle a \rangle_{j-1})^2 / 2\sigma_a^2}}{\sigma_a \cdot \sqrt{2 \cdot \pi}}$$

is the Gaussian weight, and $\sigma_a$ is the acceleration variance parameter.

The three averages are compared at successive instants, i.e., I-frame or a video sub-sampled frame, to check for sharp variations which indicate the occurrence of a new "color", and therefore, a new uniform color segment. These averages are then normalized to get the resulting numbers which may vary from 0 to 1, for example.

There is a trend in how the averages may vary. Continuously and consistently higher variance corresponds to a pan uniform color segment, for example. Finally, when new color appears, the averages would contain more information and hence are given more weight than the bins that existed from before. If $\langle v \rangle_j$ and $\langle a \rangle_j$ exceed pre-determined thresholds, then a new uniform color segment is found, otherwise the same uniform color segment exists as at instant j−1.

3. Successive Color Histogram

In this technique, in accordance with another embodiment of the present invention, a video boundary is detected by comparing color histograms between successive frames. Therefore, if CH[i][j] and CH[i][j−1] are two color histograms for the ith bin defined at frames j and j−1, then compute the following difference measure as follows:

$$DCH_S[j] = \sum_{i=1}^{9} \|CH[i][j] - CH[i][j-1]\| \quad \text{Equation (5)}$$

Here 9 bins are used as an example.

If $DCH_S[j]$ is larger than the threshold $\tau_{DCH_S}$, then the jth frame is determined as the color boundary and it is considered the first frame of a new "uniform" color video segment.

4. Stochastic Method

In accordance with yet another embodiment of the present invention, the stochastic method is based on Kalman filtering. The Kalman filter is essentially a set of mathematical equations that implement a predictor-corrector type of estimator that is optimal in the sense that it minimizes the estimated error covariance, when some presumed conditions are met. The question which is addressed by the Kalman filter is this: given the estimates of a vector of features, e.g., position and velocity of image pixels at a given time instant, what is the estimated vector value at time instant t+1. This uses the knowledge of the behavior of the state equation, and the given measurement equation.

Kalman filtering is well known in the prior art.

The general idea of the technique in accordance with the present invention is to "track" video intervals for which the color histogram CH[i][j] for the N bins indexed by i, is "uniform". For each time instant j, CH[i][j] represents a vector of N components. In Kalman filtering parlance this is called the state vector.

There are two equations that describe the Kalman filtering method: the state and measurement equations.

Before describing each equation, the following terms are defined:

The color histogram vector $$CH[j] = (CH[1][j], \ldots, CH[9][j])^T, \quad \text{Equation (6)}$$

defined at the jth frame, has nine components, one for each color bin. The color histogram difference vector DCH[j], defined as:

$$DCH[j] = (DCH[1][j], \ldots, DCH[9][j])^T = \|CH[j] - CH[j-1]\| \quad \text{Equation (7)}$$

where $\|.\|$ denotes a metric operator.

For the ith color histogram vector and color histogram difference vector we have the following state equation at time j:

$$CH[i][j+1] = CH[i][j] + DCH[i][j] + 0.5 w_{CH}[i][j], \quad \text{Equation (8.1)}$$

$$DCH[i][j+1] = DCH[i][j] + w_{DCH}[i][j], \quad \text{Equation (8.2)}$$

where $w_{CH}[\bullet][j]$ and $w_{DCH}[\bullet][j]$ represents state noise functions for the color histogram and the color histogram difference, respectively. Similarly, the two measurement equations are:

$$M_{CH}[i][j] = CH[i][j] + n_{CH}[i][j], \quad \text{Equation (9.1)}$$

$$M_{DCH}[i][j] = DCH[i][j] + n_{DCH}[i][j], \quad \text{Equation (9.2)}$$

where $n_{CH}[\bullet][j]$ and $N_{DCH}[\bullet][j]$ are measurement noise functions for the color histogram and the color histogram differences, respectively.

The four equations can be combined to form single state and measurement equations. Using CH[j] and DCH[j] the discrete state vector S[j] is defined by:

$$S[j] \equiv (CH[j], DCH[j])^T \qquad \text{Equation (10)}$$

The temporal evolution state model for S[j] is:

$$S[j+1] = F_j S[j] + D w[j], \qquad \text{Equation (11)}$$

where $$F_j = \begin{bmatrix} F_{1,j} & F_{2,j} \\ F_{3,j} & F_{4,j} \end{bmatrix}, \qquad \text{Equation (12)}$$

where $F_{1,j}, \ldots, F_{4,j}$ are 9×9 matrices, with $F_{3,j} = \underline{0}$, and $\underline{0}$ being a 9×9 zero matrix, and $$D = (0.5 \times \underline{1}, 0.5 \times \underline{1}, \underline{1}, \underline{1})^T, \qquad \text{Equation (13)}$$

with $\underline{1}$ being a 1×9 unit vector. In particular, to reproduce (8.1) and (8.2):

$$F_j = \begin{bmatrix} 1 & 1 \\ 0 & 1 \end{bmatrix} \qquad \text{Equation (14)}$$

The vector w[j] is a discrete Gaussian random variable (RV) with zero mean, i.e., $E[w[j]] = 0$, $E[w[j]w[k]] = Q\delta_{jk}$, were $E[.]$ denotes the expected value of a RV and $\delta_{jk} = 1$ if j=k, and $\delta_{jk} = 0$ otherwise.

The measurement model M[j] is:

$$M[j] = H_j S[j] + n[j], \qquad \text{Equation (15)}$$

where $$H_j = \begin{bmatrix} H_{1,j} & H_{2,j} \\ H_{3,j} & H_{4,j} \end{bmatrix}, \qquad \text{Equation (16)}$$

$H_{1,j}, \ldots, H_{4,j}$ are 9×9 matrices, and n[j] is a noise with analogous properties to w[j], i.e., $E[n[j]] = 0$, $E[n[j]n[k]] = R\delta_{jk}$. In particular, to reproduce (9.1) and (9.2), we have that:

$$H_j = \begin{bmatrix} 1 & 0 \\ 0 & 1 \end{bmatrix} \qquad \text{Equation (17)}$$

Given the state and measurement models it can be shown that the Kalman filter prediction and filtering update equations are:

Prediction:

$$\hat{S}_{j|j-1} = F_j \hat{S}_{j-1|j-1}, \qquad \text{Equation (18.1)}$$

$$\Sigma_{j|j-1} = F_j \Sigma_{j-1|j-1} F_j^T + D_j Q_j D_j^T, \qquad \text{Equation (18.2)}$$

Filtering:

$$\hat{S}_{j|j} = \hat{S}_{j|j-1} + \Sigma_{j|j-1} H_j^T (H_j \Sigma_{j|j-1} H_j^T + R_j)^{-1} (M_j - H_j \hat{S}_{j|j-1}), \qquad \text{Equation (19.1)}$$

$$\Sigma_{j|j} = \Sigma_{j|j-1} - \Sigma_{j|j-1} H_j (H_j^T \Sigma_{j|j-1} H_j + R_j)^{-1} H_j^T \Sigma_{j|j-1}, \qquad \text{Equation (19.2)}$$

where $$\hat{S}_{j|j-1} = E[S[j] | M[1], \ldots, M[j-1]], \qquad \text{Equation (20)}$$

$$\hat{S}_{j|j} = E[S[j] | M[1], \ldots, M[j]], \qquad \text{Equation (21)}$$

$$\Sigma_{j|j-1} = E[S[j] - \hat{S}_{j|j-1}][S[j] - \hat{S}_{j|j-1}]^T | M[1], \ldots, M[j-1]], \qquad \text{Equation (22)}$$

$$\Sigma_{j|j} = E[S[j] - \hat{S}_{j|j}][S[j] - \hat{S}_{j|j}]^T | M[1], \ldots, M[j]]. \qquad \text{Equation (23)}$$

$\hat{S}_{j|j-1}$ denotes the estimate of the state vector $\hat{S}$ at time instant j given measurement values up to time instant j−1. $\hat{S}_{j-1|j-1}$ is similar to $\hat{S}_{j|j-1}$, with the difference that it denotes the state vector estimated at time instant j−1. $\Sigma_{j|j-1}$ denotes the covariance matrix estimated at time instant j given measurement values up to time instant j−1, and $\Sigma_{j-1|j-1}$ denotes the covariance matrix estimated at time instant j−1 given measurement values up to time instant j−1.

As time evolves, via j, CH[i][j] gets updated. In Kalman filtering the evolvement of CH[i][j] is determined. The error, i.e., the difference between CH[i][j] and its "average" vector is also preferably determined. The color histogram difference vector is defined by DCH[i][j]=CH[i][j−1]−CH[i][j] between successive color histograms in time. The use of DCH[i][j] is to determine when CH[i][j] changes, i.e., it is the "velocity." If CH[i][j] is absolutely constant, DCH[i][j] is zero.

The more samples are acquired, the better will be the "prediction" of this joint state vector. In a given video uniform color segment, e.g., a news cast with a fixed background and foreground color palette, the more I-frames that are used in determining the color histogram vector, the better will be its prediction.

The measurement model M[j]=H$_j$S[j]+n[j], corresponds to the actual measurement values of the color histogram and its difference. In Kalman filtering there are two sets of equations: the prediction and filtering equations. The prediction part determines how the estimated state vector and variance matrix evolve from one instant to its successive instant, given the same number of frames, while the filtering part determines how the state vector and variance matrix evolve by adding a "new" frame information.

The underlying notion in Kalman filtering is that as the number of frames is increased the elements of the variance matrix go to zero and the state vector elements become "constant." The DCH elements typically go to zero while the CH elements become constant.

Accordingly, if there is a uniform color segment change, it is expected that the color palette will change, and therefore the prediction and filtering will not be satisfied any more. Therefore, it is preferable to use a measure which is determinative of when the new uniform color segment is starting. This can be done by comparing the measured difference vector MDCH[i] with the estimated difference vector (from Kalman filtering). If the vector is larger than a predetermined threshold, for example, 20% the estimated difference, then a new uniform color segment starts. Thus, a uniform color segment boundary has been detected.

Kalman filtering is typically aimed at determining the temporal evolution of variables such that their variance goes to zero asymptotically, i.e., variance becomes constant in time. However, if an abrupt change in the variable occurs, such as, for example, the direction and/or speed of an object, then the Kalman filtering would not apply. The abrupt change is typically detected by a spike in a variance value computed in the weighted average color histogram method. In accordance with the present invention, the abrupt change occurs in the presence of shot or scene changes.

5. Shot-Based Color Histogram

In accordance with another embodiment of the present invention, the shot-based color histogram technique is applied. Using this technique, video boundaries are detected based on shots.

A collection $\{Sh_1, \ldots, Sh_M\}$ of M shots of a video sequence containing N frames is provided. For each shot there is, for example, a 9-bin color histogram CH[i][j], where the index i denotes the bin position and the index j denotes the frame position in the video sequence. Any number of bins can be used depending on the application. The representative color histogram $CH[Sh_i]$ for shot $Sh_i$ is determined as the "average" color histogram within a given shot. Preferably, this technique is formulated by using Kalman filtering, as discussed above. For example, given the set of color histograms $\{CH[Sh_1], \ldots, CH[Sh_M]\}$ video uniform color segment boundaries can be determined.

6. Mosaic Color Histogram

In accordance with another embodiment of the present invention, the mosaic color histogram technique assumes a mosaic of the static part of a 3-D uniform color segment, i.e., the image background part, is computed. Computation of mosaic color histograms methods are well known in the art. For example, L. Theodosio, W. Bender, Salient Video Stills: Content and Context Preserved, Proceedings of ACM Multimedia Conference, ACM Press (1993), which is incorporated herein by reference in its entirety, discloses one of such methods. The mosaic images or panoramic overviews can be derived using camera motion detection methods as well as image composition methods. The mosaic representation is a good visual, spatio-temporal synthetic representation for a video shot. Mosaic extraction typically consists of two steps: motion estimation and motion accretion. At a given time instant of the generation process the incoming frame is merged with the current mosaic composed from previous frames. To merge the incoming frame a global motion estimation algorithm is used to find the motion parameters. Motion estimation methods are well known to those skilled in the art. For example, one classic method is optical flow computation. The method, however, is computationally intensive and lacks robustness with varying lighting conditions. Alternatively, Hausdorff distance method can be used to perform motion estimation. After motion estimation the current mosaic is computed by using a weighting function to reject parts of the image that do not belong to the background before blending the current mosaic and the warped incoming frame.

In accordance with an embodiment of the present invention, a typical method for construction of panoramic mosaics includes collecting sections called strips from each image and pasting these strips next to each other to form the mosaic. In the simple case of a panning camera (moving horizontally), vertical strips are taken from each image and pasted side by side. This process can also be viewed as scanning the scene with a vertical broom. The vertical broom is perpendicular to the horizontal optical flow. After the strips are stitched in the panoramic image, the optical flow is pointing in the direction from which the panoramic image is generated. Depending on the camera motion, different scanning methods can be selected. For example, a vertical scanning broom can be selected for panning, a horizontal scanning broom can be selected for tilting and circular scanning broom can be selected for zoom and for forward motion.

In accordance with another embodiment of the present invention, for each mosaic image, a color histogram is computed to represent the video segment from the start of the shot until the current frame. The color histogram $CH_i^{Mosaic}$ of a uniform color segment mosaic between frame number 0 and frame number j is a color histogram for a single image. The color histogram $CH^M[i][j]$ for the j-th frame mosaic is compared with that of the "family mosaic" color histogram $CH^M_F[i][j]$ by computing the following difference measure:

$$DCH_F^M[j] = \sum_{i=1}^{9} w_i \|CH^M[i][j] - CH_F^M[i][j-1]\| \qquad \text{Equation (24)}$$

Preferably, when building the mosaic for the segment for each new mosaiced image the normalized color histogram is computed for each new incoming mosaic. Normalized color histogram is preferred because the mosaic images tend to be larger than the original image. Similarly, when a new color histogram is computed and a new color bin gets new colors, (i.e. a new color comes in) the histogram of the mosaic contains more information. Hence, the new color bins are given more importance than the bins that existed from before, i.e. a higher weight $w_i$ is assigned for that color bin. As discussed above, $L_1$ measure can be used to assign the weight. Alternatively, a person skilled in the art would appreciate that other measures as discussed above can be used, such as for example, $L_2$, histogram intersection, Chi-Square, or binwise histogram intersection.

In accordance with an embodiment of the present invention, the mosaic color histogram method proceeds as discussed in section 1 above on family color histogram.

7. Computable Macro-Segment Boundary

A computable scene is typically defined as a sequence of uniform temporal segments that are related to each other. For example, a dialog scene is a sequence of temporal segments showing the two participants in the dialog.

In accordance with an embodiment of the present invention, the macro-segment boundary detection method includes a step of comparing from a list of family (cumulative) histograms, $\{P_1, \ldots, P_z\}$, each family histogram $P_i$ to the subsequent family histograms $P_{i+j}$ (where $1 < j$, $z \geq j$). Preferably, the look ahead window does not have to span over all the histograms until the end of the program (e.g. TV show, or consumer home video). Preferably, the assumption is that the span should not be more than half an hour into the future since most sitcoms are half an hour long. Similarly, in movies or longer programs the visual content is normally developed in a continuous manner, i.e. scenes build up on previous scenes or repetition of scenes.

Consequently, in accordance with an embodiment of the present invention, the macro-segment boundary detection method includes the following steps:

a) Performing uniform segmentation as explained in sections 1, 2 or 6.

b) Creating cumulative histograms for each uniform segment for the entire TV program.

c) For each histogram of a segment creating a similarity curve $y_j(x)$ that plots the similarities with the rest of the histograms until the end of the program (or the end of the lookahead window). The x-axis is the frame number (or time) and the y axis is the similarity measure between the current cumulative histogram for the current segment and all the future cumulative histograms. Accordingly, the similarity curve is formulated as follows:

$$y_j(x) = \begin{cases} 0 & 0 \le x < j-1 \\ 1 - DCH[j] & x > j \end{cases} \quad \text{Equation (25)}$$

d) Generating the additive similarity curve of all similarity curves representing the similarity between temporal segments and the future temporal segments. The additive similarity curve can be formulated as follows:

$$Y(x) = \sum_{j=1}^{N} y_j(x) \quad \text{Equation (26)}$$

e) Finally, a program boundary exists if similarity can not be established between a series of histograms $P_k \ldots P_j$ and $P_{j+m} \ldots P_t$, i.e. there is a clear discontinuity between the connected (similar) nodes. For the additive similarity curve this means that the curve is crossing the x-axis every time there is a boundary. In addition, for the zero-segments there are two choices: 1) to take the entire zero segment as a macro segment, or 2) to make a boundary at each new microsegment number.

Figure 5:
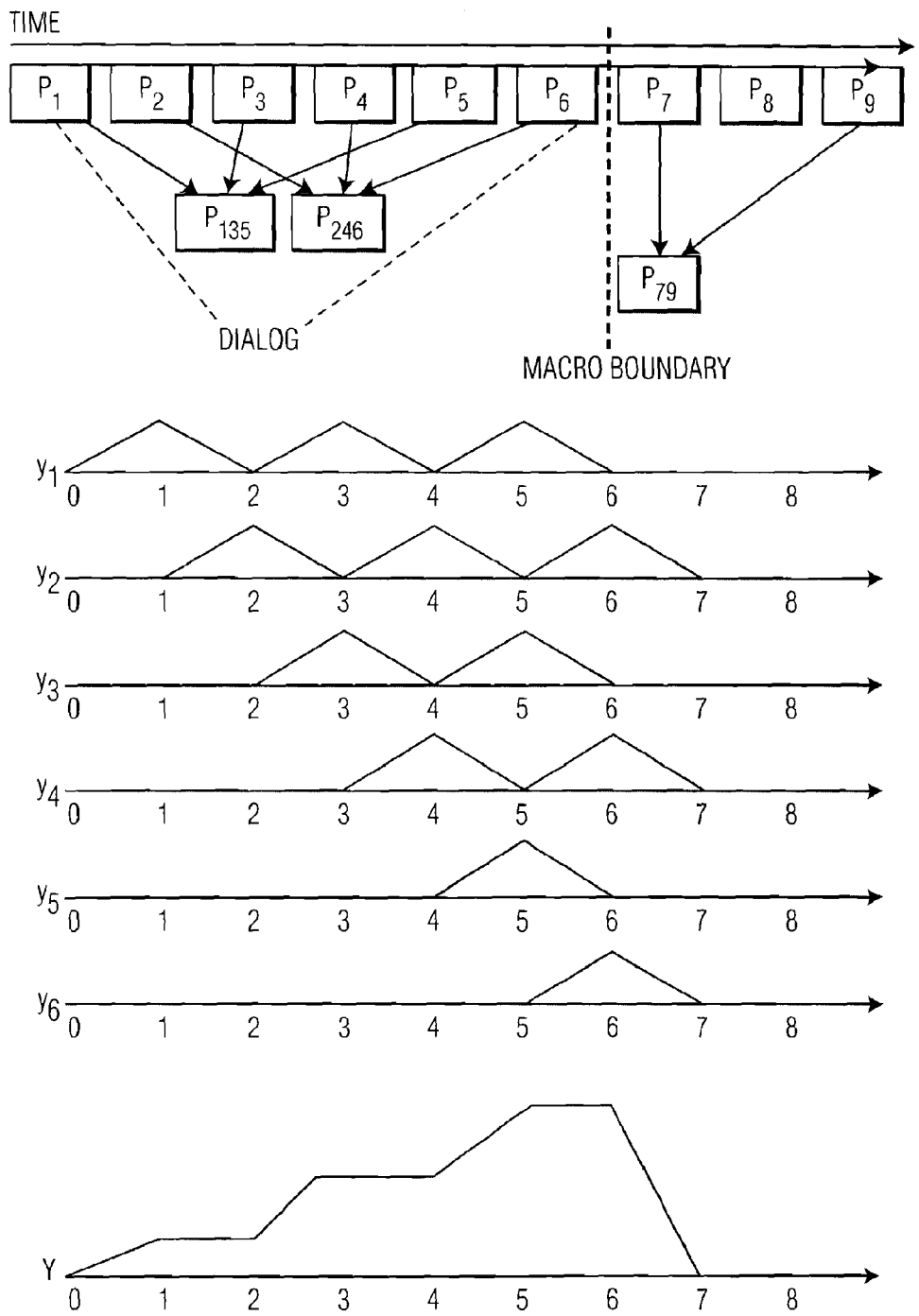
FIG. 5 is an illustration of one example of macro boundary determination method for a dialog macro segment based on cumulative histograms in accordance with an embodiment of the present invention.

Typically, in a show, there are repeating family histograms interspersed with histograms from commercials as illustrated in FIG. 5. For example, the cumulative histograms $P_{14}$ and $P_{35}$ are derived from interspersed histograms. Histograms $P_2$ and $P_6$ are disruptive histograms and therefore probably belong to a commercial break. There is similarity between the first five histograms, and between seventh and eighth histogram, which means that there is a boundary between $P_6$ and $P_7$.

Figure 6:
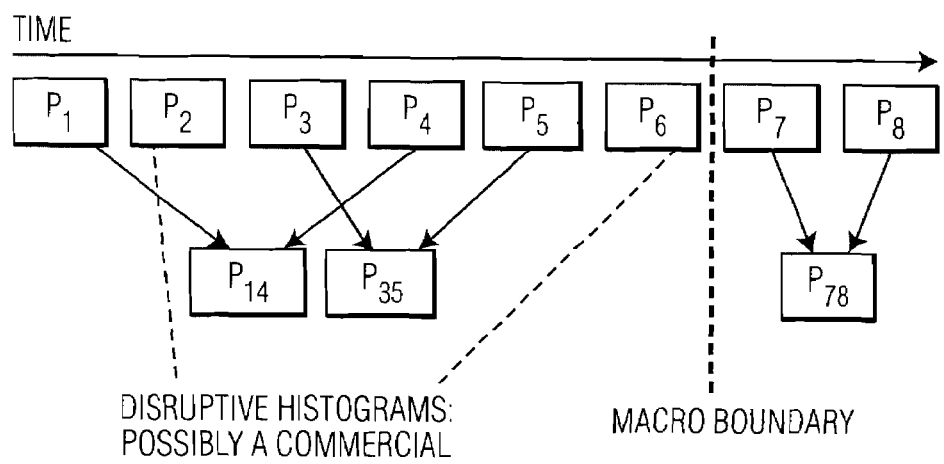
FIG. 6 is an illustration of one example of macro boundary determination method based on cumulative histograms in accordance with an embodiment of the present invention.

FIG. 6 illustrates an example of a macro boundary after a dialog macro segment and the corresponding similarity functions. The similarity functions $y_1(x) \ldots y_6(x)$ are shown for the first six uniform temporal segments constituting a dialog macro segment. The additive similarity functions show the similarity within the set of the first six segments $P_1$ through $P_6$.

It will be apparent to those skilled in the art that various modifications and variations can be made in the method and system of the present invention without departing from the spirit and scope of the invention. Thus, it is intended that the present invention includes modifications and variations that are within the scope of the appended claims and their equivalents.

Figure 7:
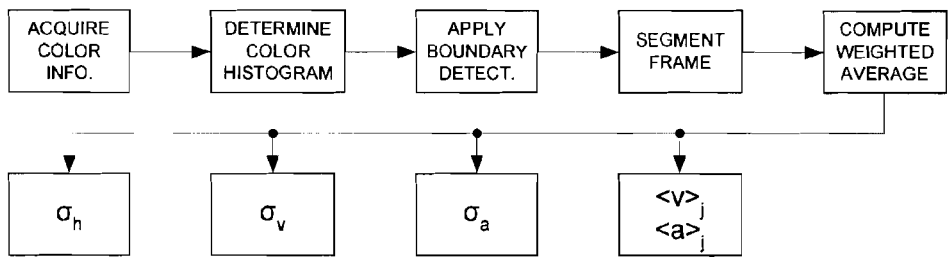
FIG. 7 is a flow diagram illustrating methods for detecting segment boundaries, in accordance with embodiments of the invention.

Thus, with reference to FIG. 7, methods in accordance with embodiments of the invention can include 7. (currently amended) A method of detecting segment boundaries for a series of successive frames in a video sequence comprising: acquiring color information from each frame; a color histogram for each frame;

applying a boundary detection technique utilizing the color histograms; segmenting the frames of the video sequence into uniform color segments, wherein the boundary detection method applied is a weighted average color histogram method, which includes the steps of computing a weighted average color histogram height and a weighted average color histogram height variance; and computing a weighted average color histogram height variance of the variance.

Methods can also include acquiring color information from each frame; determining a color histogram for each frame; applying a boundary detection technique utilizing the color histograms; and segmenting the frames of the video sequence into uniform color segments, wherein the boundary detection technique applied is a weighted average color histogram method, which includes the steps of computing a weighted average color histogram height and a weighted average color histogram height variance. The methods can also include the weighted average color histogram height is based on:

$$\langle h \rangle_j = \sum_{i=1}^{\#bins} h_{i,j} \frac{e^{-\frac{(h_{i,j} - \langle h \rangle_{j-1})^2}{2 \cdot \sigma_h^2}}}{\sigma_h \cdot \sqrt{2 \cdot \pi}},$$

where $$\frac{e^{-\frac{(h_{i,j} - \langle h \rangle_{j-1})^2}{2 \cdot \sigma_h^2}}}{\sigma_h \cdot \sqrt{2 \cdot \pi}}$$

represents a Gaussian weight function that depends on an average histogram height $\langle h \rangle_{j-4}$, defined for a j-1th time instant, $\sigma_h$ is a height variance parameter, and $h_{i,j}$ is a weight assigned to an ith bin of a jth frame and the weighted average color histogram height variance is based on:

$$\langle v \rangle_j = \sum_{i=1}^{\#bins} v_{i,j} \frac{e^{-\frac{(v_{i,j} - \langle v \rangle_{j-1})^2}{2 \cdot \sigma_v^2}}}{\sigma_v \cdot \sqrt{2 \cdot \pi}}$$

where $v_{i,j} = h_{i,j} - \langle h \rangle_j$, and represents a difference between a weight assigned to the ith bin of the jth frame and an average histogram height defined for a jth frame, $$\frac{e^{-\frac{(v_{i,j} - \langle v \rangle_{j-1})^2}{2 \cdot \sigma_v^2}}}{\sigma_v \cdot \sqrt{2 \cdot \pi}}$$

is the Gaussian variance weight, $\sigma$, is the variance parameter, and $\langle v \rangle_j$ is the weighted avenge color histogram height variance at a jth time instant, as well as the weighted average color histogram height variance of the variance is based on:

$$\langle a \rangle_j = \sum_{i=1}^{\#bins} a_{i,j} \frac{e^{-\frac{(a_{i,j} - \langle a \rangle_{j-1})^2}{2 \cdot \sigma_a^2}}}{\sigma_a \cdot \sqrt{2 \cdot \pi}}$$

where $v_{i,j} = h_{i,j} - \langle h \rangle_j$, and represents a difference between a weight assigned to the ith bin of the jth frame and an average histogram height defined for a jth frame, $a_{i,j} = v_{i,j} - \langle v \rangle_j$, $\langle v \rangle_1$ being a weighted average color histogram height variance at a jth time instant, $$\frac{e^{\frac{(a_{i,j} - \langle a \rangle_{j-1})^2}{2 \cdot \sigma_a^2}}}{\sigma_a \cdot \sqrt{2 \cdot \pi}}$$

is a Gaussian weight, $\sigma_a$ is an acceleration variance parameter, and $\langle a \rangle_j$ is the weighted average color histogram height variance of the variance and of comparing the weighted averages $\langle v \rangle_j$ and $\langle a \rangle_j$ to pre-determined thresholds and determining a new uniform color segment when the weighted averages exceed the pre-determined threshold values.

The method can also include at least one includes said height; at least one includes said height variance; at least one includes both said height and said height variance; a Gaussian weight function utilizes at least one of said height and said height variance in said boundary detection technique and at least one of said height and said height variance is iteratively computed from frame to frame.

Figure 8:
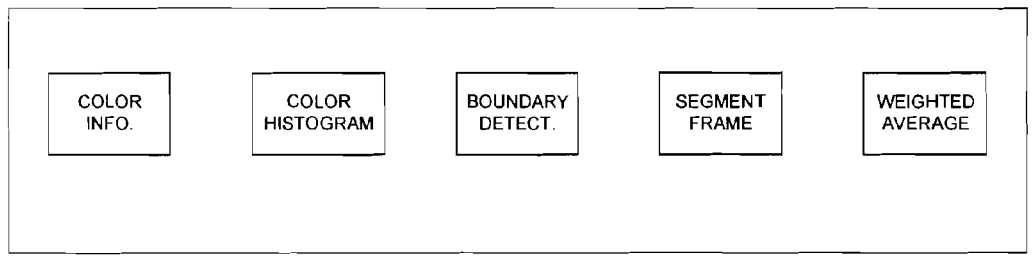
FIG. 8 is a schematic diagram illustrating a system for detecting segment boundaries, in accordance with embodiments of the invention.
Figure 8:
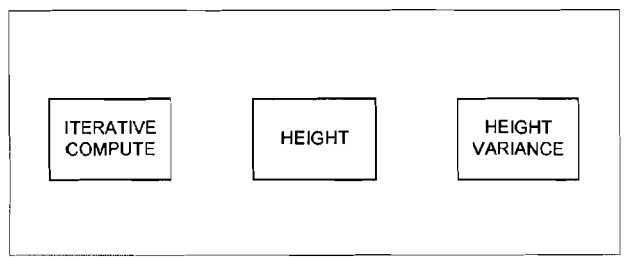

Thus, with reference to FIG. 8, system in accordance with embodiments of the invention can include:
  means for acquiring color information from each frame;
  means for determining a color histogram for each frame;
  means for applying a boundary detection technique utilizing the color histograms;
  means for segmenting the frames of the video sequence into uniform color segments, wherein the boundary detection technique is a weighted average color histogram method, which includes the steps of computing a weighted average color histogram height and a weighted average color histogram height variance and; means for computing a weighted average color histogram height variance of the varience.

What is claimed is:

1. A method of detecting segment boundaries for a series of successive frames in a video sequence comprising:
  acquiring color information from each frame;
  determining a color histogram for each frame;
  applying a boundary detection technique utilizing the color histogram;
  segmenting the frames of the video sequence into uniform color segments, wherein the boundary detection technique applied is a weighted average color histogram method, which includes the steps of computing a weighted average color histogram height and a weighted average color histogram height variance; and
computing a weighted average color histogram height variance of the variance.

2. The method of claim 1, wherein the weighted average color histogram height variance of fine variance is based on:

$$\langle a \rangle_j = \sum_{i=1}^{\#bins} a_{i,j} \frac{e^{\frac{(a_{i,j} - \langle a \rangle_{j-1})^2}{2 \cdot \sigma_a^2}}}{\sigma_a \cdot \sqrt{2 \cdot \pi}}$$

where $v_{i,j} \equiv h_{i,j} - \langle h \rangle_j$, and represents a difference between a weight assigned to the ith bin of the jth frame and an average histogram height defined for a jth frame, $a_{i,j} \equiv v_{i,j} - \langle v \rangle_j$, $\langle v \rangle_j$ being a weighted average color histogram height variance at a jth time instant, $$\frac{e^{\frac{(a_{i,j} - \langle a \rangle_{j-1})^2}{2 \cdot \sigma_o^2}}}{\sigma_o \cdot \sqrt{2 \cdot \pi}}$$

is a Gaussian weight, $\sigma_a$ is an acceleration variance parameter, and $\langle a \rangle_j$ is the weighted average color histogram height variance of the variance.

3. The method of claim 2, further comprising the steps of comparing the weighted averages $\langle v \rangle_j$ and $\langle a \rangle_j$ to pre-determined thresholds and determining a new uniform color segment when the weighted averages exceed the pre-determined threshold values.

4. The method of claim 1, wherein at least one of said height and said height variance is iteratively computed from frame to frame.

5. The method of claim 4, wherein said at least one includes said height.

6. The method of claim 4, wherein said at least one includes said height variance.

7. The method of claim 6, wherein said at least one includes both said height and said height variance.

8. The method of claim 1, wherein a Gaussian weight function utilizes at least one of said height and said height variance in said boundary detection technique.

9. The method of claim 8, wherein at least one of said height and said height variance is iteratively computed from frame to frame.

10. A method of detecting segment boundaries for a series of successive frames in a video sequence comprising:
  acquiring color information from each frame;
  determining a color histogram for each frame;
  applying a boundary detection technique utilizing the color histograms; and
  segmenting the frames of the video sequence into uniform color segments, wherein the boundary detection technique applied is a weighted average color histogram method, which includes the steps of computing a weighted average color histogram height and a weighted average color histogram height variance;
wherein the weighted average color histogram height is based on:

$$\langle h \rangle_j = \sum_{i=1}^{\#bins} h_{i,j} \frac{e^{\frac{(h_{i,j} - \langle h \rangle_{j-1})^2}{2 \cdot \sigma_h^2}}}{\sigma_h \cdot \sqrt{2 \cdot \pi}},$$

where $$\frac{e^{\frac{(h_{i,j} - \langle h \rangle_{j-1})^2}{2 \cdot \sigma_h^2}}}{\sigma_h \cdot \sqrt{2 \cdot \pi}}$$

represents a Gaussian weight function that depends on an average histogram height $\langle h \rangle_{j-1}$ defined for a j−1th time instant $\sigma_h$ is a height variance parameter, and $h_{i,j}$ is a weight assigned to an ith bin of a jth frame.

11. A method of detecting segment boundaries for a series of successive frames in a video sequence comprising:
  acquiring color information from each frame;
  determining a color histogram for each frame;

applying a boundary detection technique utilizing the color histograms; and segmenting the frames of the video sequence into uniform color segments, wherein the boundary detection technique applied is a weighted average color histogram method, which includes the steps of computing a weighted average color histogram height and a weighted average color histogram height variance;

wherein the weighted average color histogram height variance is based on:

$$\langle v \rangle_j = \sum_{i=1}^{\#bins} v_{i,j} \frac{e^{\frac{(v_{i,j} - \langle v \rangle_{j-1})^2}{2 \cdot \sigma_v^2}}}{\sigma_v \cdot \sqrt{2 \cdot \pi}}$$

where $v_{i,j} = h_{i,j} - \langle h \rangle_j$, and represents a difference between a weight assigned to the ith bin of the jth frame and an average histogram height defined for a jth frame, $$\frac{e^{\frac{(v_{i,j} - \langle v \rangle_{j-1})^2}{2 \cdot \sigma_v^2}}}{\sigma_v \cdot \sqrt{2 \cdot \pi}}$$

is the Gaussian variance weight, $\sigma_v$ is the variance parameter, and $\langle v \rangle_j$ is the weighted average color histogram height variance at a jth time instant.

12. A system for detecting segment boundaries for a series of successive frames in a video sequence comprising:

means for acquiring color information from each frame;

means for determining a color histogram for each frame;

means for applying a boundary detection technique utilizing the color histograms;

means for segmenting the frames of the video sequence into uniform color segments, wherein the boundary detection technique is a weighted average color histogram method, which includes the steps of computing a weighted average color histogram height and a weighted average color histogram height variance and;

means for computing a weighted average color histogram height variance of the varience.

13. The system of claim 12, wherein at least one of said height and said height variance is iteratively computed from frame to frame.

14. The system of claim 13, wherein said at least one includes said height.

15. The system of claim 13, wherein said at least one includes said height variance.

16. The system of claim 13, wherein said at least one includes both said height and said height variance.

17. The system of claim 12, wherein a Gaussian weight function utilizes at least one of said height and said height variance in said boundary detection technique.

18. The system of claim 17, wherein at least one of said height and said height variance is iteratively computed from frame to frame.

* * * * *